US012689811B2

(12) United States Patent
Li

(10) Patent No.: US 12,689,811 B2
(45) Date of Patent: Jul. 21, 2026

(54) MULTIMEDIA DATA PROCESSING METHOD AND APPARATUS, DEVICE AND MEDIUM

(71) Applicant: Beijing Zitiao Network Technology Co., Ltd., Beijing (CN)

(72) Inventor: Xinwei Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 32 days.

(21) Appl. No.: 18/291,408

(22) PCT Filed: Sep. 27, 2023

(86) PCT No.: PCT/CN2023/122068
§ 371 (c)(1),
(2) Date: Jan. 23, 2024

(87) PCT Pub. No.: WO2024/082948
PCT Pub. Date: Apr. 25, 2024

(65) Prior Publication Data
US 2025/0106486 A1    Mar. 27, 2025

(30) Foreign Application Priority Data
Oct. 21, 2022    (CN) .......................... 202211295639.8

(51) Int. Cl.
H04N 21/854        (2011.01)
H04N 21/2368      (2011.01)
(Continued)

(52) U.S. Cl.
CPC ....... H04N 21/854 (2013.01); H04N 21/2368 (2013.01); H04N 21/4318 (2013.01); H04N 21/44016 (2013.01)

(58) Field of Classification Search
CPC ............. H04N 21/854; H04N 21/2368; H04N 21/4318
See application file for complete search history.

(56) References Cited

U.S. PATENT DOCUMENTS 9,721,611 B2 * 8/2017 Matias ................. G11B 27/031
10,748,577 B2 * 8/2020 Matias .................. G11B 27/34
(Continued)

FOREIGN PATENT DOCUMENTS

CN        105379254 A        3/2016
CN        107517323 A        12/2017
(Continued)

OTHER PUBLICATIONS

Extended European Search Report for European Application No. 23825187.0, mailed Dec. 13, 2024, 13 Pages.
(Continued)

*Primary Examiner* — Pinkal R Chokshi
(74) *Attorney, Agent, or Firm* — BakerHostetler

(57)        ABSTRACT
A multimedia data processing method and apparatus, a device and a medium, wherein the method includes: receiving text information input by a user; generating multimedia data based on the text information, in response to a processing instruction for the text information, and exhibiting a multimedia edit interface for performing an edition operation on the multimedia data, wherein the multimedia data includes a plurality of multimedia clips, and the multimedia edit interface includes a first edit track, a second edit track and a third edit track, and the first track clip, the second track clip and the third track clip whose timelines are aligned on the edit tracks respectively identify a text clip, a video image clip and a voice clip corresponding thereto.

19 Claims, 7 Drawing Sheets

(51) Int. Cl.
H04N 21/431 (2011.01)
H04N 21/44 (2011.01)

(56) References Cited

U.S. PATENT DOCUMENTS

| | | | | |
|---|---|---|---|---|
| 2001/0047266 | A1 | 11/2001 | Fasciano | |
| 2008/0002949 | A1* | 1/2008 | Tokunaka | G11B 27/34 |
| | | | | 386/338 |
| 2012/0117583 | A1* | 5/2012 | Gunatilake | G06T 7/20 |
| | | | | 725/19 |
| 2015/0371679 | A1* | 12/2015 | Oz | H04N 5/76 |
| | | | | 386/285 |
| 2017/0064353 | A1* | 3/2017 | Kim | H04N 21/854 |
| 2019/0104259 | A1* | 4/2019 | Angquist | G11B 27/34 |
| 2022/0044703 | A1 | 2/2022 | Chang | |
| 2023/0308731 | A1* | 9/2023 | Lee | G11B 27/031 |
| 2024/0064367 | A1 | 2/2024 | Li et al. | |
| 2024/0231577 | A1* | 7/2024 | Kim | G06F 3/0482 |

FOREIGN PATENT DOCUMENTS

| | | | | | |
|---|---|---|---|---|---|
| CN | 111930289 | A | | 11/2020 | |
| CN | 112015927 | A | | 12/2020 | |
| CN | 112287128 | A | | 1/2021 | |
| CN | 113207025 | A | * | 8/2021 | G11B 27/031 |
| CN | 114513706 | A | | 5/2022 | |
| EP | 4339805 | A1 | | 3/2024 | |
| JP | 2005062420 | A | | 3/2005 | |
| JP | 2011082789 | A | | 4/2011 | |
| WO | 2023072172 | A1 | | 5/2023 | |

OTHER PUBLICATIONS

Notice of Reasons for Refusal for Japanese Application No. 2024-503680, mailed Dec. 17, 2024, 8 pages.

* cited by examiner

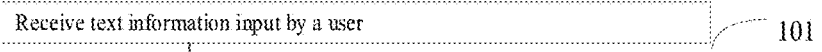

Receive text information input by a user     101

Generate multimedia data based on the text information, in response to a processing instruction for the text information, and exhibiting a multimedia edit interface for performing an edition operation on the multimedia data, wherein, The multimedia data includes: a plurality of multimedia clips; the plurality of multimedia clips respectively correspond to the plurality of text clips split from the text information; the plurality of multimedia clips include a plurality of voice clips generated through speeches respectively corresponding to the plurality of text clips, and a plurality of video image clips respectively matched with the plurality of text clips;

The multimedia edit interface includes: a first edit track, a second edit track, and a third edit track, wherein, the first edit track includes a plurality of first track clips, the plurality of first track clips are respectively used to identify the plurality of text clips; the second edit track includes a plurality of second track clips, the plurality of second track clips are respectively used to identify the plurality of video image clips; the third edit track includes a plurality of third track clips, the plurality of third track clips are respectively used to identify the plurality of voice clips; wherein, the first track clip, the second track clip, and the third track clip whose timelines are aligned on the edit tracks respectively identify a text clip, a video image clip and a voice clip corresponding thereto.

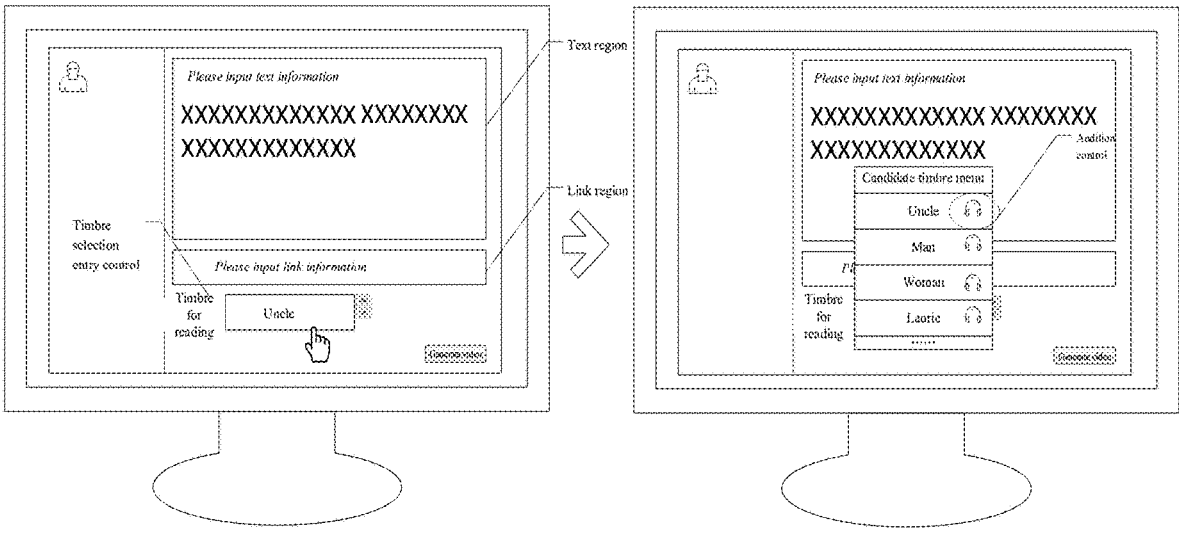

FIG. 2

Multimedia data

| Multimedia clip | Multimedia clip | Multimedia clip | Multimedia clip |
|---|---|---|---|
| Text clip | Text clip | Text clip | Text clip |
| Video image clip | Video image clip | Video image clip | Video image clip |
| Voice clip | Voice clip | Voice clip | Voice clip |

······

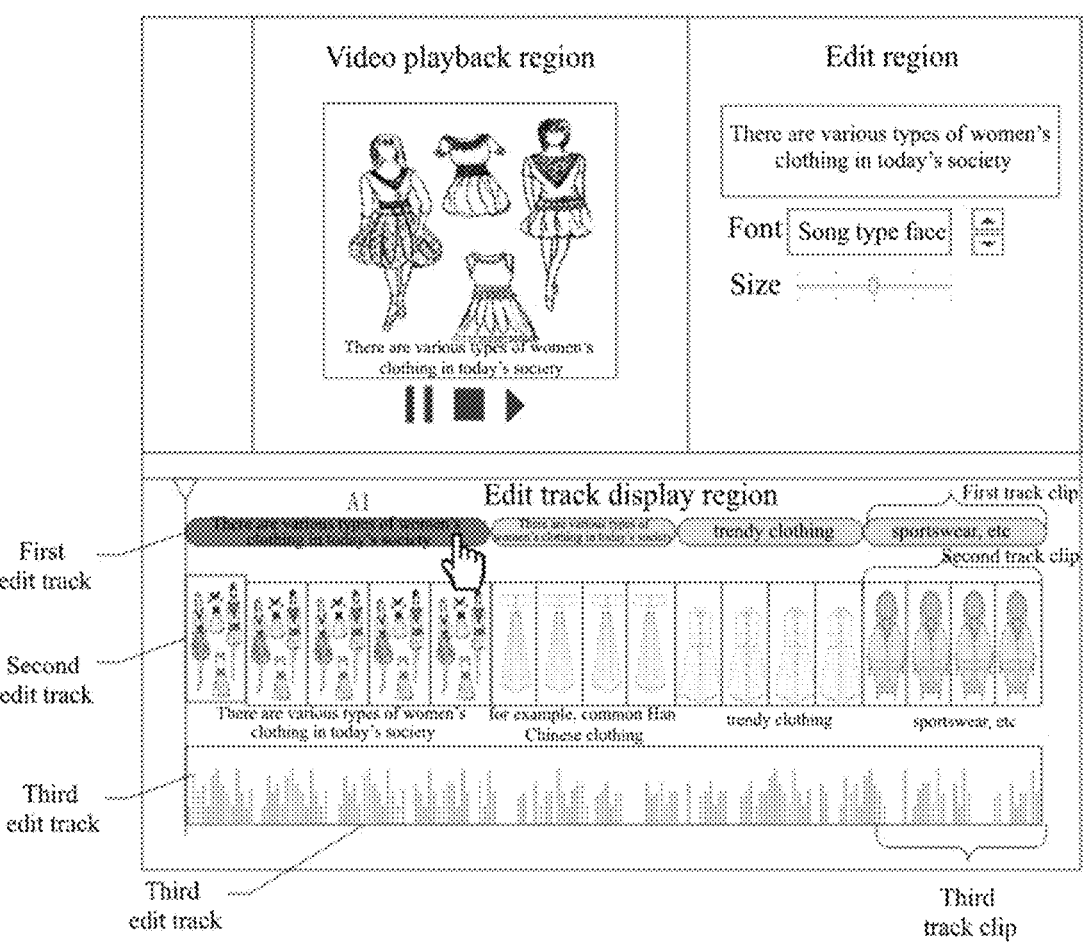

FIG. 5

| | |
|---|---|
| Display a currently identified text clip on the first target track clip in a text edit region, in response to a first target track clip selected by a user on a first edit track | 601 |
| Update the identified target text clip on the first target track clip, based on the target text clip generated through modification performed by the user on the currently displayed text clip in the text edit region | 602 |

FIG. 6

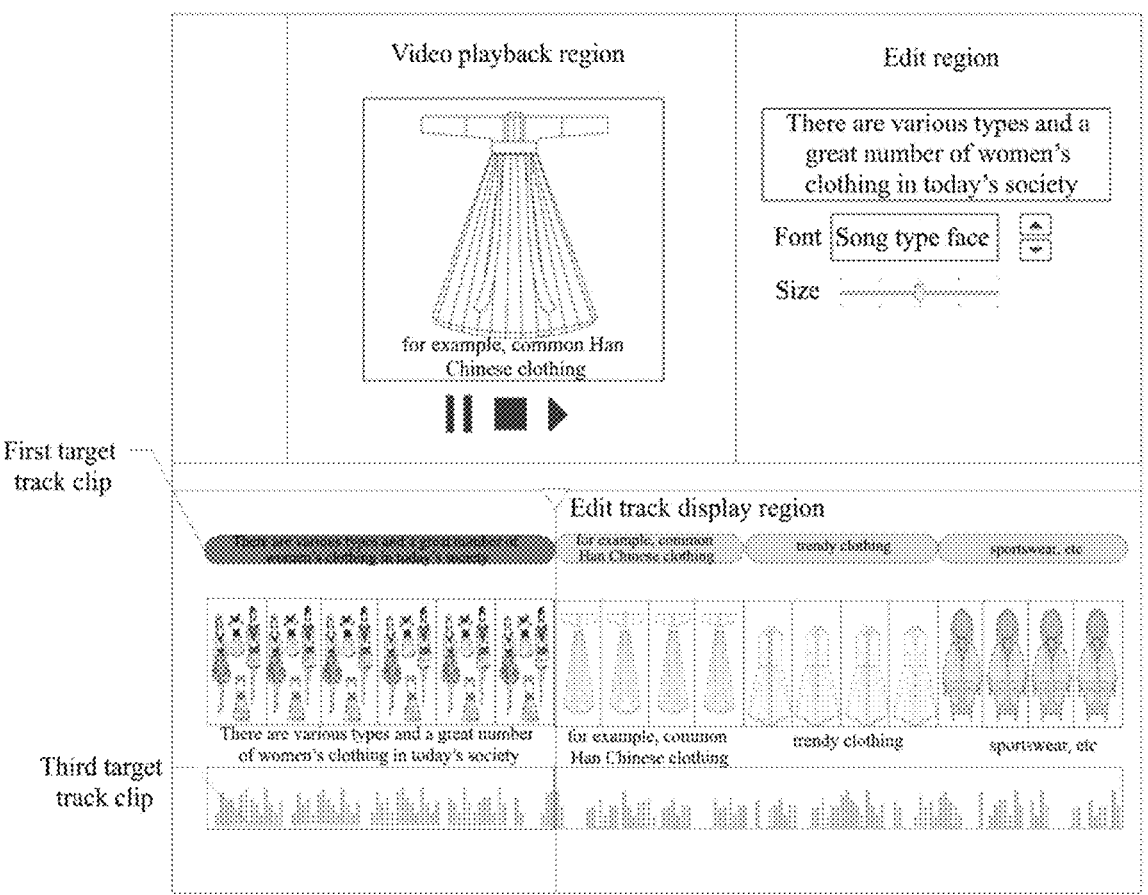

FIG. 9

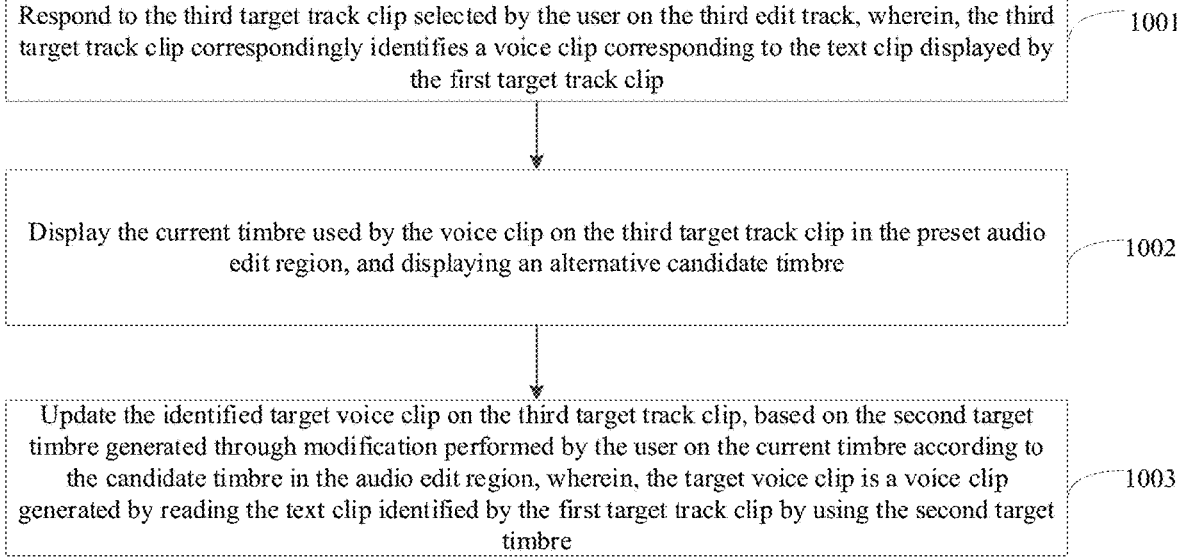

Respond to the third target track clip selected by the user on the third edit track, wherein, the third target track clip correspondingly identifies a voice clip corresponding to the text clip displayed by the first target track clip    1001

Display the current timbre used by the voice clip on the third target track clip in the preset audio edit region, and displaying an alternative candidate timbre    1002

Update the identified target voice clip on the third target track clip, based on the second target timbre generated through modification performed by the user on the current timbre according to the candidate timbre in the audio edit region, wherein, the target voice clip is a voice clip generated by reading the text clip identified by the first target track clip by using the second target timbre    1003

FIG. 10

Video playback region

Audio edit region

Elderly    Kid    Woman

Man    Laurie    ......

There are various types of women's clothing in today's society

Edit track display region

There are various types of women's clothing in today's society    for example, common Han Chinese clothing    trendy clothing    sportswear, etc There are various types of women's clothing in today's society    for example, common Han Chinese clothing    trendy clothing    sportswear, etc Third target track clip

FIG. 11

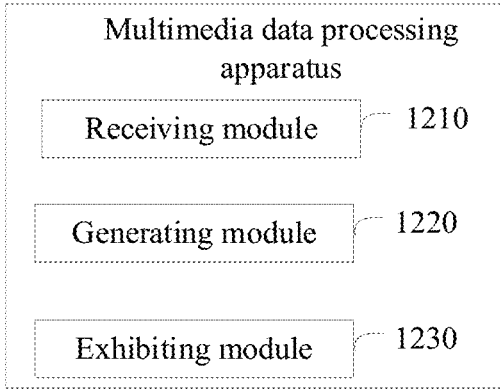

Multimedia data processing apparatus

Receiving module    1210

Generating module    1220

Exhibiting module    1230

FIG. 12

MULTIMEDIA DATA PROCESSING METHOD AND APPARATUS, DEVICE AND MEDIUM

This application is the U.S. National Stage of International Patent Application No. PCT/CN2023/122068, filed on Sep. 27, 2023, which claims the priority to and benefits of Chinese Patent Application No. 202211295639.8, filed on Oct. 21, 2022. All the aforementioned patent applications are hereby incorporated by reference in their entireties.

TECHNICAL FIELD

The present disclosure relates to a multimedia data processing method and apparatus, a device and a medium.

BACKGROUND

With development of computer technology, the ways of sharing knowledge and information are becoming increasingly diverse; in addition to information carriers of texts and audio, information carriers of videos are also widely available.

In related technologies, a relevant image video including a text content is generated, according to a text content to be shared by a user. However, users' creativity changes at any time, and the current creative style is rigid, incapable of meeting users' requirements of fine granularity for flexible processing, and quality of multimedia data is not high.

SUMMARY

In order to solve the above-described technical problems or at least partially solve the above-described technical problems, the present disclosure provides a multimedia data processing method and apparatus, a device and a medium.

The embodiments of the disclosure provide a multimedia data processing method, comprising: receiving text information input by a user; generating multimedia data based on the text information, in response to a processing instruction for the text information, and exhibiting a multimedia edit interface for performing an edition operation on the multimedia data, wherein, the multimedia data comprises a plurality of multimedia clips; the plurality of multimedia clips respectively correspond to a plurality of text clips split from the text information; the plurality of multimedia clips comprise a plurality of voice clips generated through speeches respectively corresponding to the plurality of text clips, and a plurality of video image clips respectively matched with the plurality of text clips; the multimedia edit interface comprises: a first edit track, a second edit track and a third edit track; the first edit track comprises a plurality of first track clips, the plurality of first track clips are respectively used to identify the plurality of text clips; the second edit track comprises a plurality of second track clips, the plurality of second track clips are respectively used to identify the plurality of video image clips; the third edit track comprises a plurality of third track clips, the plurality of third track clips are respectively used to identify the plurality of voice clips; and the first track clip, the second track clip and the third track clip whose timelines are aligned on the edit tracks respectively identify a text clip, a video image clip and a voice clip corresponding thereto.

The embodiments of the disclosure also provide a multimedia data processing apparatus, comprising: a receiving module, configured to receive text information input by a user; a generating module, configured to generate multimedia data based on the text information, in response to a processing instruction for the text information; an exhibiting module, configured to exhibit a multimedia edit interface for performing an edition operation on the multimedia data, wherein, the multimedia data comprises: a plurality of multimedia clips; the plurality of multimedia clips respectively correspond to a plurality of text clips split from the text information; the plurality of multimedia clips comprise a plurality of voice clips generated through speeches respectively corresponding to the plurality of text clips, and a plurality of video image clips respectively matched with the plurality of text clips; the multimedia edit interface comprises: a first edit track, a second edit track and a third edit track; the first edit track comprises a plurality of first track clips, the plurality of first track clips are respectively used to identify the plurality of text clips; the second edit track comprises a plurality of second track clips, the plurality of second track clips are respectively used to identify the plurality of video image clips; the third edit track comprises a plurality of third track clips, the plurality of third track clips are respectively used to identify the plurality of voice clips; and the first track clip, the second track clip, and the third track clip whose timelines are aligned on the edit tracks respectively identify a text clip, a video image clip and a voice clip corresponding thereto.

The embodiments of the disclosure also provide an electronic device, comprising: a processor; and a memory, configured to store executable instructions, wherein, the processor is configured to read the executable instructions from the memory, and execute the executable instructions to implement the multimedia data processing method provided by the embodiment of the present disclosure.

The embodiments of the present disclosure also provide a computer readable storage medium, having a computer program stored therein, wherein, the computer program is configured to execute the multimedia data processing method provided by the embodiments of the present disclosure.

The embodiments of the present disclosure also provide a computer program product, and when the instructions in the computer program product are executed by a processor, the multimedia data processing method provided by the embodiments of the present disclosure is realized. The technical scheme provided by the embodiments of the present disclosure has the following advantages:

The multimedia data processing solution provided by the embodiment of the present disclosure includes: receiving text information input by a user; generating multimedia data based on the text information, in response to a processing instruction for the text information, and exhibiting a multimedia edit interface for performing an edition operation on the multimedia data, wherein, the multimedia data includes a plurality of multimedia clips; the plurality of multimedia clips respectively correspond to a plurality of text clips split from the text information; the plurality of multimedia clips include a plurality of voice clips generated through speeches respectively corresponding to the plurality of text clips, and a plurality of video image clips respectively matched with the plurality of text clips; the multimedia edit interface includes: a first edit track, a second edit track and a third edit track; wherein, a first track clip corresponding to the first edit track, a second track clip corresponding to the second edit track, and a third track clip corresponding to the third edit track whose timelines are aligned on the edit tracks respectively identify a text clip, a video image clip and a voice clip corresponding thereto; in the embodiment of the present disclosure, the edit tracks corresponding to the multimedia data are enriched, which may meet diverse edition needs of the multimedia data and improve quality of the multimedia data.

BRIEF DESCRIPTION OF THE DRAWINGS

The above-described and other features, advantages and aspects of the respective embodiments of the present disclosure will become more apparent when taken in conjunction with the accompanying drawings and with reference to the detailed description below. Throughout the drawings, same or similar reference signs refer to same or similar elements. It should be understood that, the drawings are schematic and that originals and elements are not necessarily drawn to scale.

FIG. 1 is a schematic flow chart of a multimedia data processing method provided by an embodiment of the present disclosure;

FIG. 2 is a schematic diagram of a text input interface provided by an embodiment of the present disclosure;

FIG. 5 is a schematic diagram of a multimedia edit interface provided by an embodiment of the present disclosure;

FIG. 6 is a schematic flow chart of another multimedia data processing method provided by an embodiment of the present disclosure;

FIG. 9 is a schematic diagram of another multimedia data processing scenario provided by an embodiment of the present disclosure;

FIG. 10 is a schematic flow chart of another multimedia data processing method provided by an embodiment of the present disclosure;

FIG. 11 is a schematic diagram of another multimedia data processing scenario provided by an embodiment of the present disclosure;

FIG. 12 is a structural schematic diagram of a multimedia data processing apparatus provided by an embodiment of the present disclosure.

DETAILED DESCRIPTION

Figures 3, 4:
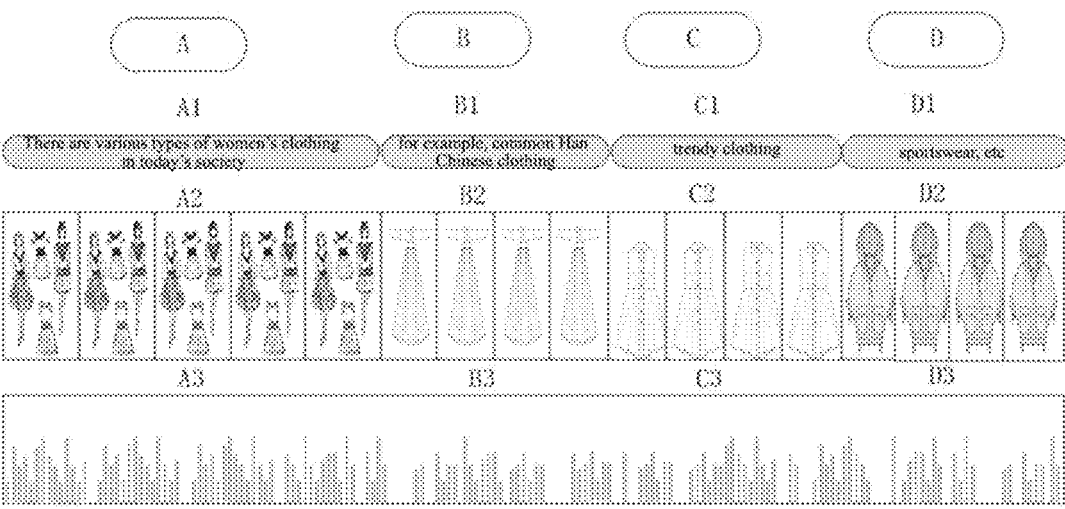
FIG. 3 is a schematic diagram of composition of a multimedia clip of multimedia data provided by an embodiment of the present disclosure.
FIG. 4 is a schematic diagram of a multimedia data processing scenario provided by an embodiment of the present disclosure.

Embodiments of the present disclosure will be described in more detail below with reference to the accompanying drawings. While certain embodiments of the present disclosure are shown in the drawings, it should be understood that, the present disclosure may be embodied in various forms and should not be construed as limited to the embodiments set forth herein. Rather, these embodiments are provided for thorough and complete understanding of the present disclosure. It should be understood that, the drawings and the embodiments of the present disclosure are only for exemplary purposes, and are not intended to limit the protection scope of the present disclosure.

It should be understood that various steps described in the method implementations of the present disclosure may be executed in different orders and/or in parallel. Further, the method implementations may include additional steps and/or or omit execution of the steps shown. The scope of the present disclosure will not be limited in this regard.

The term "including/comprising" and variants thereof used herein are open including, that is, "including but not limited to". The term "based on" is "at least partially based on". The term "one embodiment" represents "at least one embodiment"; the term "another embodiment" represents "at least one other embodiment"; and the term "some embodiments" represents "at least some embodiments". Relevant definitions of other terms will be given in description below.

It should be noted that concepts such as "first", "second", etc. as mentioned in the present disclosure are only used to distinguish apparatuses, modules or units, but not to define orders or interdependence of functions executed by these apparatuses, modules or units.

It should be noted that modification of "one" and "a plurality of" as mentioned in the present disclosure is exemplary rather than restrictive, and those skilled in the art should understand that unless otherwise explicitly specified in the context, it should be understood as "one or more".

Names of messages or information interacted between a plurality of apparatuses according to the implementations of the present disclosure are only used for illustrative purposes, and are not used to limit the scope of these messages or information.

In order to solve the above-described problems, an embodiment of the present disclosure provides a multimedia data processing method; in the method, multimedia data is split into a plurality of edit tracks such as a text edit track, a video image edit track and a voice edit track; and corresponding information is edited through an edition operation on the edit tracks, which, thus, may meet diverse edition needs of multimedia data and improve quality of multimedia data.

Hereinafter, the multimedia data processing method is introduced in conjunction with specific embodiments.

FIG. 1 is a schematic flow chart of a multimedia data processing method provided by an embodiment of the present disclosure; the method may be executed by a multimedia data processing apparatus, wherein, the apparatus may be implemented by using software and/or hardware, and may usually be integrated into an electronic device such as a computer. As shown in FIG. 1, the method includes:

Step 101: receiving text information input by a user.

In one embodiment of the present disclosure, as shown in FIG. 2, a text input interface for editing a text may be provided, and the input interface includes a text region and a link region; in this embodiment, the text information may be edited in a customized manner according to needs of video fabrication, that is, receiving the text information input by the user in the text region of the text edit interface, or pasting an authorized link and extracting text information from the link, etc., that is, receiving link information input by the user in the link region, identifying the link information to acquire text information on a corresponding text, and displaying the same in the text region for edition by the user, that is, the text information displayed in the text region may also be edited multiple times.

Since a time length is usually limited during video fabrication, accordingly, in some possible embodiments, the number of words in the text information is also limited, for example, not exceeding 2,000 words, etc.; therefore, it may be checked whether the number of words within the text region exceeds a limit; if the limit is exceeded, a word-limit pop-up window may be exhibited to remind the user.

In an embodiment of the present disclosure, with further reference to FIG. 2, in addition to the text region and the link region, the text input interface may further include a video generation button and a timbre selection entry control, which may display a candidate timbre menu, in response to a trigger operation of the user for the timbre selection entry control, wherein, the candidate timbre menu includes one or more candidate timbres (a plurality of candidate timbres may include various types of timbres such as Uncle, Boy, Girl, Laurie, etc.), as well as an audition control corresponding to a candidate timbre; when the user triggers the audition control, some or all of the text information input by the user will be played in a corresponding candidate timbre.

In this embodiment, the user may select a timbre from diverse candidate timbres when inputting the text information, so as to determine a first target timbre according to a selection operation by the user for the candidate timbre menu; further, a plurality of voice clips generated through speeches of the plurality of text clips split from the text information based on the first target timbre are acquired; at this time, a timbre of each voice clip is the first target timbre, which improves efficiency in selecting the first target timbre, on the basis of meeting personalized selection of the first target timbre.

Wherein, when splitting the text information into a plurality of voice clips, the text information may be subjected to phrase segmentation according to a reading habit of the first target timbre, to determine a text clip included in each segmented phrase; or, the text information may be split into a plurality of voice clips according to semantic information of the text information, and the text information is converted into a plurality of voice clips corresponding to a plurality of text clips with the text clips as conversion granularity.

Step 102: generating multimedia data based on the text information, in response to a processing instruction for the text information, and exhibiting a multimedia edit interface for performing an edition operation on the multimedia data, wherein, The multimedia data includes: a plurality of multimedia clips; the plurality of multimedia clips respectively correspond to the plurality of text clips split from the text information; the plurality of multimedia clips include a plurality of voice clips generated through speeches respectively corresponding to the plurality of text clips, and a plurality of video image clips respectively matched with the plurality of text clips;

The multimedia edit interface includes: a first edit track, a second edit track, and a third edit track, wherein, the first edit track includes a plurality of first track clips, the plurality of first track clips are respectively used to identify the plurality of text clips; the second edit track includes a plurality of second track clips, the plurality of second track clips are respectively used to identify the plurality of video image clips; the third edit track includes a plurality of third track clips, the plurality of third track clips are respectively used to identify the plurality of voice clips; wherein, the first track clip, the second track clip, and the third track clip whose timelines are aligned on the edit tracks respectively identify a text clip, a video image clip and a voice clip corresponding thereto.

In an embodiment of the present disclosure, an entry for editing and processing the text information is provided; through the entry, a processing instruction for the text information is acquired. For example, the entry for editing and processing the text information may be a "Generate video" control displayed in the text edit interface; when it is detected that a user triggers the "Generate video" control in the text edit interface, the processing instruction for the text information is acquired; of course, in other possible embodiments, an entry for editing and processing text information may also be a gesture action input entry, a voice information input entry, etc.

In an embodiment of the present disclosure, the multimedia data is generated based on the text information, in response to the processing instruction for the text information, wherein, the multimedia data includes a plurality of multimedia clips; the plurality of multimedia clips respectively correspond to a plurality of text clips split from the text information; and the plurality of multimedia clips include a plurality of voice clips generated through speeches respectively corresponding to the plurality of text clips, and a plurality of video image clips matched with the plurality of text clips.

That is to say, as shown in FIG. 3, in this embodiment, the generated multimedia data is composed of a plurality of multimedia clips with clips as granularity; each multimedia clip at least includes three types of information, respectively, text clip, voice clip (an initial timbre of the voice clip may be the first target timbre, etc. selected in the text edit interface according to the above-described embodiment), video image clip (the video image clip may include a video stream composed of consecutive pictures, wherein, the consecutive pictures may correspond to pictures in the video stream matched in a preset video library, or may also be one or more pictures obtained through matching in a preset image material library), etc.

For example, as shown in FIG. 4, the text information input by the user is "There are various types of women's clothing in today's society, for example, common Han Chinese clothing, trendy clothing, sportswear, etc.", four multimedia clips A, B, C, D are generated after processing the text information; wherein, multimedia clip A includes text clip A1 "There are various types of women's clothing in today's society", voice clip A3 corresponding to text clip A1, video image clip A2 matched with text clip A1; multimedia clip B includes text clip B1 "for example, common Han Chinese clothing", voice clip A3 corresponding to text clip B1, and video image clip B2 matched with text clip B1; multimedia clip C includes text clip C1 "trendy clothing", voice clip C3 corresponding to text clip C1, and video image clip C2 matched with text clip C1; multimedia clip D includes text clip D1 "sportswear, etc.", voice clip D3 corresponding to text clip D1, and video image clip D2 matched with text clip D1.

As mentioned above, in this embodiment, the multimedia data includes at least three information types; in order to meet diverse edition needs of multimedia data, in one embodiment of the present disclosure, a multimedia edit interface for performing an edition operation on the multimedia data is exhibited, wherein, the multimedia edit interface includes: a first edit track, a second edit track and a third edit track, wherein, the first edit track includes a plurality of first track clips, the plurality of first track clips are respectively used to identify a plurality of text clips; the second edit track includes a plurality of second track clips, the plurality of second track clips are respectively used to identify a plurality of video image clips; the third edit track includes a plurality of third track clips, the plurality of third track clips are respectively used to identify a plurality of voice clips; wherein, in order to facilitate intuitive reflection of the various types of information clips corresponding to each piece of multimedia data, the first track clip corresponding to the first edit track, the second track clip corresponding to the second edit track, and the third track clip corresponding to the third edit track whose timelines are aligned on the edit tracks respectively identify a text clip, a video image clip and a voice clip corresponding thereto.

In the embodiment of the present disclosure, after splitting the multimedia data into a plurality of multimedia clips, each multimedia clip is split into edit tracks corresponding to a plurality of information types; and thus, the user may not only edit a single multimedia clip, but also edit a certain information clip corresponding under a certain edit track in a single multimedia clip, which meets diverse edition requests, and may ensure quality of generated multimedia data.

It should be noted that in different application scenarios, display modes of the multimedia edit interface are different; as a possible implementation, as shown in FIG. 5, the multimedia edit interface may include a video playback region, an edit region, and an edit track display region; wherein, the edit track display region displays the first track clip corresponding to the first edit track, the second track clip corresponding to the second edit track and the third track clip corresponding to the third edit track in a timeline aligned manner.

Wherein, the edit region is used to display an editing function control corresponding to a currently selected information clip (the specific editing function control may be set according to needs of experimental scenarios); the video playback region is used to display an image and text information of the multimedia data at a current playback time point (wherein, a reference line corresponding to the current playback time point may be displayed in a direction perpendicular to the timeline in the edit track display region; the reference line is used to indicate a current playback position of the multimedia data, wherein, the reference line may also be dragged, and the video playback region synchronously displays an image and text information of the multimedia clip in a real-time position corresponding to the reference line, making it easy for the user to view the multimedia data frame by frame based on forward and backward movement of the reference line); the video playback region may also play a video playback control; when the video playback control is triggered, the current multimedia data is displayed, and thus the user may intuitively know a playback effect of the current multimedia data.

Continuing with the scenario shown in FIG. 4 as an example, in FIG. 5, in the edit track display region, four multimedia clips A, B, C, D as well as A1A2A3B1B2B3C1C2C3D1D2D3 corresponding to the four multimedia clips A, B, C, D are displayed in a timeline aligned manner. If text clip A1 is selected, an edit interface corresponding to text clip A1 will be displayed in the edit region; the edit interface includes editable A1, as well as edition controls such as font and size. At this time, the video playback region displays multimedia data in a corresponding position of the reference line of the current multimedia data.

It should be emphasized that in addition to the above-described three edit tracks, the multimedia edit interface according to this embodiment may further include other edit tracks; the number of other edit tracks is not displayed; each other edit track may be used to display an information clip of other dimension corresponding to the multimedia data, for example, when the other edit tracks include an edit track for editing a background sound of the multimedia data, that is, the multimedia edit interface may further include a fourth edit track for identifying background audio data, so in response to a trigger operation for the fourth edit track, a current background sound used by the fourth edit track is displayed in a preset background sound edit region (e.g., the edit region as mentioned in the above-described embodiment), and an alternative candidate background sound is displayed; the alternative candidate background sound may be displayed in any style such as a tag of the background sound edit region; and based on a target background sound generated through modifying the current background sound by the user according to the candidate background sound in the background sound edit region, identifying the target background sound is updated on the fourth edit track.

In summary, in the multimedia data processing method according to the embodiment of the present disclosure, the multimedia data is split into a plurality of multimedia clips; each multimedia clip has an edit track corresponding to each information type, according to the information type included thereby; an information clip under a certain information type included in the multimedia clip may be edited and modified on the edit track, which, thus, enriches the edit tracks corresponding to multimedia data, may meet diverse edition needs of multimedia data and improve quality of multimedia data.

Hereinafter, it will be illustrated how to edit different information types of multimedia information clips corresponding to multimedia data, in conjunction with specific embodiments.

In one embodiment of the present disclosure, a text clip corresponding to a multimedia information clip may be individually edited and modified.

In this embodiment, as shown in FIG. 6, the steps of individually editing and modifying the text clip corresponding to the multimedia information clip include:

Step 601: displaying a currently identified text clip on the first target track clip in a text edit region, in response to a first target track clip selected by a user on a first edit track.

In an embodiment of the present disclosure, the first target track clip selected by the user on the first edit track is responded to, wherein, the number of first target track clips may be one or more; and further, the currently identified text clip on the first target edit track clip is displayed in the text edit region, wherein, the text edit region may be located in the edit region as mentioned in the above-described embodiment. Wherein, the text edit region may not only include the currently identified text clip on the editable first target track clip, but also include other functional edition controls for the text clip, for example, a font edition control, a font size edition control, etc.

Step 602: updating to identifying a target text clip on the first target track clip, based on the target text clip generated through modification performed by the user on the currently displayed text clip in the text edit region.

In this embodiment, based on the target text clip generated through modification performed by the user on the currently displayed text clip in the text edit region, identifying the target text clip is updated on the first target track clip.

Figure 7:
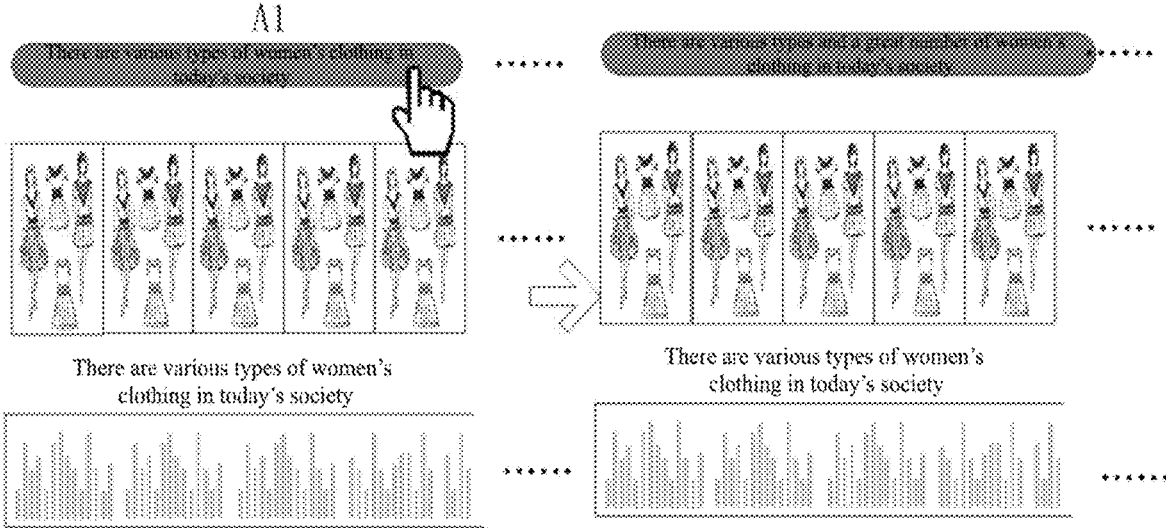
FIG. 7 is a schematic diagram of another multimedia data processing scenario provided by an embodiment of the present disclosure.

For example, as shown in FIG. 7, when the currently identified text clip on the first target track clip selected by the user is "There are various types of women's clothing in today's society", if the user modifies the currently displayed text clip in the text edit region to "There are various types and a great number of women's clothing in today's society", then the text clip may be updated to "There are various types and a great number of women's clothing in today's society" on the first target track, which, thus, implements targeted modification on an individual text clip, and meet requirements for modifying individual text clips of multimedia data.

In an embodiment of the present disclosure, in order to further improve quality of multimedia data and ensure image text matching, an image in the video image clip may also be updated synchronously, according to modification on the text clip. In this embodiment, in response to the text update operation performed on the target text clip on the first target track clip, a second target track clip corresponding to the first target track clip is determined on the second edit track, a target video image clip matched with the target text clip is acquired, and identifying the target video image clip is updated on the second target track clip.

Wherein, the target text may be semantically matched with images in the preset image material library to determine a corresponding target video image; further, a target video clip may be generated according to the target video image; or, the video clip matched with the target text clip may also be directly determined in the preset video clip material library as the target video image clip, etc., which will not be limited here.

In an embodiment of the present disclosure, in order to ensure synchronization of word and pronunciation, the voice clip may also be synchronously modified according to modification on the text clip.

That is, in this embodiment, in response to the text update operation performed on the target text clip on the first target track clip, a third target track clip corresponding to the first target track clip is determined on the third edit track clip; the third track clip includes a voice clip corresponding to the text clip in the first target track clip; a target voice clip corresponding to the target text clip is acquired, for example, the target voice clip is acquired by reading the target text clip; and identifying the target voice clip is updated on the third target track clip, which, thus, implements synchronous modification of voice and text.

With further reference to FIG. 7, when the currently identified text clip on the first target track clip selected by the user is "There are various types of women's clothing in today's society", if the user modifies the currently displayed text clip in the text edit region to "There are various types and a great number of women's clothing in today's society", then the text clip may be updated to "There are various types and a great number of women's clothing in today's society" on the first target track, a third target track clip corresponding to the first target track clip is determined on the third edit track, and a voice clip on the third target track clip is updated from "There are various types of women's clothing in today's society" to "There are various types and a great number of women's clothing in today's society".

As mentioned above, in the process of editing and modifying the text clip, a time length corresponding to the text clip after modification on the timeline is different from a time length corresponding to the text clip before modification on the timeline. Therefore, in different application scenarios, the edit tracks in the edit track display region may be displayed differently, with respect to such variation in time length.

In an embodiment of the present disclosure, if the video image clip corresponding to the multimedia clip needs to be defined as a main information clip with a time length unchangeable according to scenario needs, then in order to ensure the time length of the video image clip to be unchangeable, in a case where it is detected that a first update time length corresponding to the target text clip on the first edit track is inconsistent with the time length corresponding to the text clip before modification, the second edit track is kept unchanged, that is, the time length of the corresponding video image clip is ensured to be unchanged, and a first update track clip corresponding to the first update time length is displayed in a preset first candidate region.

Wherein, the target text clip is identified on the first update track clip. The first candidate region may be located in other region such as an upper region of the text clip before modification. Thus, even if it is known that the first update time length corresponding to the target text clip on the first edit track is inconsistent with the time length corresponding to the text clip before modification, the target text clip is not merely displayed in a form such as "ascending track", so that the time length of the video image clip corresponding to the second edit track will not be modified accordingly, and a time length corresponding to a text information clip in other multimedia clip will not be affected visually.

In a case where it is detected that a third update time length corresponding to the target voice clip on the third edit track is inconsistent with a time length corresponding to a voice clip before modification, the second edit track is kept unchanged, and a third update track clip corresponding to the third update time length is displayed in a preset second candidate region, wherein, the target voice clip is identified on the third update track clip. Wherein, the second candidate region may be located in other region such as a lower region of the voice clip before modification. Thus, even if it is known that the third update time length of the target voice clip on the third edit track is inconsistent with the time length corresponding to the voice clip before modification, the target voice clip is not merely displayed in a form such as "descending track", so that the time length of the video image clip corresponding to the second edit track will not be modified accordingly, and a time length corresponding to a voice clip in other multimedia information clip will not be affected visually.

Figure 8:
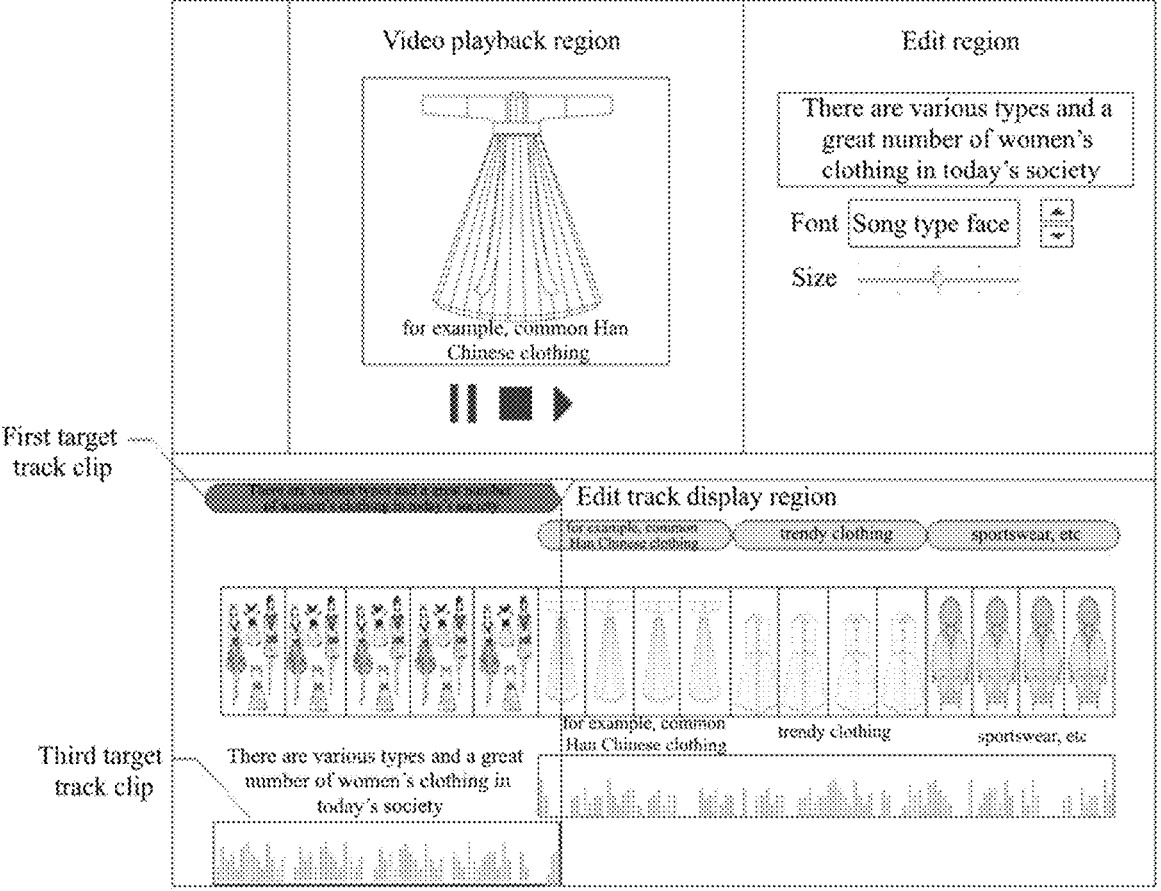
FIG. 8 is a schematic diagram of another multimedia data processing scenario provided by an embodiment of the present disclosure.

For example, as shown in FIG. 8, taking the scenario shown in FIG. 7 as an example, since the text clip after modification "There are various types and a great number of women's clothing in today's society" has a corresponding time length obviously elongated relative to the text clip before modification "There are various types of women's clothing in today's society", the text clip after modification "There are various types and a great number of women's clothing in today's society" may be displayed above the text clip before modification, keeping the time length of the corresponding video image clip unchanged.

In this embodiment, since the voice clip after modification "There are various types and a great number of women's clothing in today's society" has a corresponding time length obviously elongated relative to the voice clip before modification "There are various types of women's clothing in today's society", the voice clip after modification "There are various types and a great number of women's clothing in today's society" may be displayed below the voice clip before modification, keeping the time length of the corresponding video image clip unchanged, which meets the requirement that the time length of the video image clip is unchangeable in the corresponding scenario.

In an embodiment of the present disclosure, if the video image clip corresponding to the multimedia clip needs to be synchronized with other information clips on the timeline according to scenarios, then in order to ensure synchronization of the video image clip on the timeline, in a case where it is detected that the first update time length corresponding to the target text clip on the first edit track is inconsistent with the time length corresponding to the text clip before modification, a length of the first target track clip is adjusted according to the first update time, that is, the length of the first target track clip is scaled in the original display position; similarly, in a case where it is detected that the third update time length of the target voice clip on the third edit track is inconsistent with the time length corresponding to the voice clip before modification, a length of the third target track clip is adjusted according to the third update time.

Further, a length of the second target track clip corresponding to the first target track clip and the third target track clip on the second edit track is correspondingly adjusted, to align the timelines of the adjusted first target track clip, the adjusted second target track clip, and the adjusted third target track clip, so as to align all information clips included in the multimedia clip on the timeline.

For example, as shown in FIG. 9, taking the scenario shown in FIG. 7 as an example, since the text clip after modification "There are various types and a great number of women's clothing in today's society" has a corresponding time length obviously elongated relative to the text clip before modification "There are various types of women's clothing in today's society", the length of the first target track clip of the text clip before modification may be elongated for display, and the text clip after modification "There are various types and a great number of women's clothing in today's society" is displayed in the adjusted first target track clip.

In this embodiment, since the voice clip after modification "There are various types and a great number of women's clothing in today's society" has the corresponding time length obviously elongated relative to the voice clip before modification "There are various types of women's clothing in today's society", the length of the second target track clip of the voice clip before modification may be elongated for display, and the voice clip after modification "There are various types and a great number of women's clothing in today's society" is displayed in the adjusted second target track clip.

In order to implement synchronization between the video image clip and other information clip, in this embodiment, the length of the second target track clip corresponding to the first target track clip and the third target track clip on the second edit track is adjusted correspondingly, so that the timelines of the adjusted first target track clip, the adjusted second target track clip, and the adjusted third target track clip are aligned.

In an embodiment of the present disclosure, the voice clip corresponding to the multimedia information clip may be individually edited and modified.

In this embodiment, as shown in FIG. 10, the steps of individually editing and modifying the voice clip corresponding to the multimedia information clip include:

Step 1001: responding to the third target track clip selected by the user on the third edit track, wherein, the third target track clip correspondingly identifies a voice clip corresponding to the text clip displayed by the first target track clip.

In an embodiment of the present disclosure, the third target track clip selected by the user on the third edit track is responded to, wherein, the number of third target track clips may be one or more, and the third target track clip correspondingly identifies the voice clip corresponding to the text clip displayed by the first target track clip; that is, in this embodiment, the voice clip may be edited individually.

Step 1002: displaying the current timbre used by the voice clip on the third target track clip in the preset audio edit region, and displaying an alternative candidate timbre.

Wherein, the preset audio edit region according to this embodiment may be located in the edit region as mentioned in the above-described embodiment; the preset audio edit region displays the current timbre used by the voice clip on the third target track clip, and displays the alternative candidate timbre; wherein, as shown in FIG. 11, candidate alternative timbres may be displayed in any style such as a tag form, for example, tags such as "Uncle", "Girl", "Elderly", etc. that may display candidate alternative timbres, and the user may select a candidate timbre by triggering a corresponding tag.

Step 1003: updating to identify a target voice clip on the third target track clip, based on the second target timbre generated through modification performed by the user on the current timbre according to the candidate timbre in the audio edit region, wherein, the target voice clip is a voice clip generated by reading the text clip identified by the first target track clip by using the second target timbre.

In this embodiment, the user may trigger a candidate timbre to modify the current timbre, and modify the current timbre into the triggered candidate timbre, that is, the second target timbre, so that the timbre of the voice clip on the third track clip is modified, which meets the need of the user to modify a timbre of a certain voice clip, for example, the user may modify a plurality of voice clips corresponding to the third track clip into different timbres, so as to implement a fun voice playback effect.

In summary, the multimedia data processing method according to the embodiment of the present disclosure may have the text clip, the voice clip, etc. corresponding to the multimedia clip flexibly edited and modified individually, which further meets diverse edition needs of multimedia data and improve quality of multimedia data.

In order to implement the above-described embodiments, the present disclosure further proposes a multimedia data processing apparatus.

FIG. 12 is a structural schematic diagram of a multimedia data processing apparatus provided by an embodiment of the present disclosure; and the apparatus may be implemented by software and/or hardware and usually may be integrated into an electronic device for multimedia data processing. As shown in FIG. 12, the apparatus includes: a receiving module 1210, a generating module 1220, and an exhibiting module 1230, wherein, The receiving module 1210 is configured to receive text information input by a user;

The generating module 1220 is configured to generate multimedia data based on the text information, in response to a processing instruction for the text information;

The exhibiting module 1230 is configured to exhibit a multimedia edit interface for performing an edition operation on the multimedia data, wherein, The multimedia data includes: a plurality of multimedia clips; the plurality of multimedia clips respectively correspond to a plurality of text clips split from the text information; the plurality of multimedia clips include a plurality of voice clips generated through speeches respectively corresponding to the plurality of text clips, and a plurality of video image clips respectively matched with the plurality of text clips;

The multimedia edit interface includes: a first edit track, a second edit track and a third edit track, wherein, the first edit track includes a plurality of first track clips, the plurality of first track clips are respectively used to identify the plurality of text clips; the second edit track includes a plurality of second track clips, the plurality of second track clips are respectively used to identify the plurality of video image clips; the third edit track includes a plurality of third track clips, the plurality of third track clips are respectively used to identify the plurality of voice clips; wherein, the first track clip, the second track clip, and the third track clip whose timelines are aligned on the edit tracks respectively identify a text clip, a video image clip and a voice clip corresponding thereto.

Optional, the receiving module is specifically configured to:

Receive text information input by the user in a text region; and/or,

Receive link information input by the user in a link region, identify the link information to acquire text information on a corresponding page, and display the same in the text region for edition by the user.

Optionally, it further includes:

A first displaying module, configured to display a timbre selection entry control;

A second displaying module, configured to display a candidate timbre menu, in response to a trigger operation of the user for the timbre selection entry control, wherein, the candidate timbre menu includes candidate timbres, as well as an audition control corresponding to the candidate timbre;

A timbre determining module, configured to determine a first target timbre according to a selection operation of the user for the candidate timbre menu;

A voice clip acquiring module, configured to acquire a plurality of voice clips generated through speeches of the plurality of text clips split from the text information based on the first target timbre.

Optionally, it further includes:

A third displaying module, configured to display a currently identified text clip on a first target track clip in the text edit region, in response to the first target track clip selected by the user on the first edit track;

A text clip editing module, configured to update to identify a target text clip on the first target track clip, based on the target text clip generated through modification performed by the user on the currently displayed text clip in the text edit region.

Optionally, it further includes:

A track clip determining module, configured to determine a third target track clip corresponding to the first target track clip on the third edit track clip, in response to the text update operation performed on the target text clip on the first target track clip;

A voice clip acquiring module, configured to acquire a target voice clip corresponding to the target text clip, and update to identify the target voice clip on the third target track clip.

Optionally, it further includes: a first time length display processing module, configured to:

Keep the second edit track unchanged, in a case where it is detected that a first update time length corresponding to the target text clip on the first edit track is inconsistent with a time length corresponding to the text clip before modification, and display a first update track clip corresponding to the first update time length in a preset first candidate region, wherein, the target text clip is identified on the first update track clip;

Keep the second edit track unchanged, in a case where it is detected that a third update time length corresponding to the target voice clip on the third edit track is inconsistent with a time length corresponding to the voice clip before modification, and display a third update track clip corresponding to the third update time length in a preset second candidate region, wherein, the target voice clip is identified on the third update track clip.

Optionally, it further includes: a second time length display processing module, configured to:

Adjust a length of the first target track clip according to a first update time, in a case where it is detected that a first update time length corresponding to the target text clip on the first edit track is inconsistent with a time length corresponding to the text clip before modification;

Adjust a length of the third target track clip according to a third update time, in a case where it is detected that a third update time length corresponding to the target voice clip on the third edit track is inconsistent with a time length corresponding to the voice clip before modification;

Correspondingly adjust a length of a second target track clip corresponding to the first target track clip and the third target track clip on the second edit track, so that timelines of the adjusted first target track clip, the adjusted second target track clip, and the adjusted third target track clip are aligned.

Optionally, it further includes: a video image updating module, configured to:

Determine a second target track clip corresponding to the first target track clip is on the second edit track, in response to a text update operation performed on the target text clip on the first target track clip;

Acquire a target video image clip matched with the target text clip, and update to identify the target video image clip on the second target track clip.

Optionally, it further includes: a voice updating module, configured to:

Respond to a third target track clip selected by the user on the third edit track, wherein, the third target track clip correspondingly identifies the voice clip corresponding to the text clip displayed by the first target track clip;

Display a current timbre used by the voice clip on the third target track clip in a preset audio edit region, and display an alternative candidate timbre;

Update to identify a target voice clip on the third target track clip, based on the second target timbre generated through modification performed by the user on the current timbre according to the candidate timbre in the audio edit region, wherein, the target voice clip is a voice clip generated by reading the text clip identified by the first target track clip by using the second target timbre.

Optional, the multimedia edit interface further includes:

A fourth edit track, configured to identify background audio data;

A background sound displaying module, configured to display a current background sound used by the fourth edit track in a preset background sound edit region, in response to a trigger operation for the fourth edit track, and display an alternative candidate background sound;

A background sound update processing module, configured to update to identify a target background sound on the fourth edit track, based on the target background sound generated through modification by the user on the current background sound according to the candidate background sound in the background sound edit region.

The multimedia data processing apparatus provided by the embodiment of the present disclosure may execute the multimedia data processing method provided by any embodiment of the present disclosure, and has corresponding functional modules executing the method and beneficial effects, and no details will be repeated here.

In order to implement the above-described embodiments, the present disclosure further proposes a computer program product, including a computer program/instruction, wherein, the computer program/instruction, when executed by a processor, implements the multimedia data processing method according to the above-described embodiment.

Figure 13:
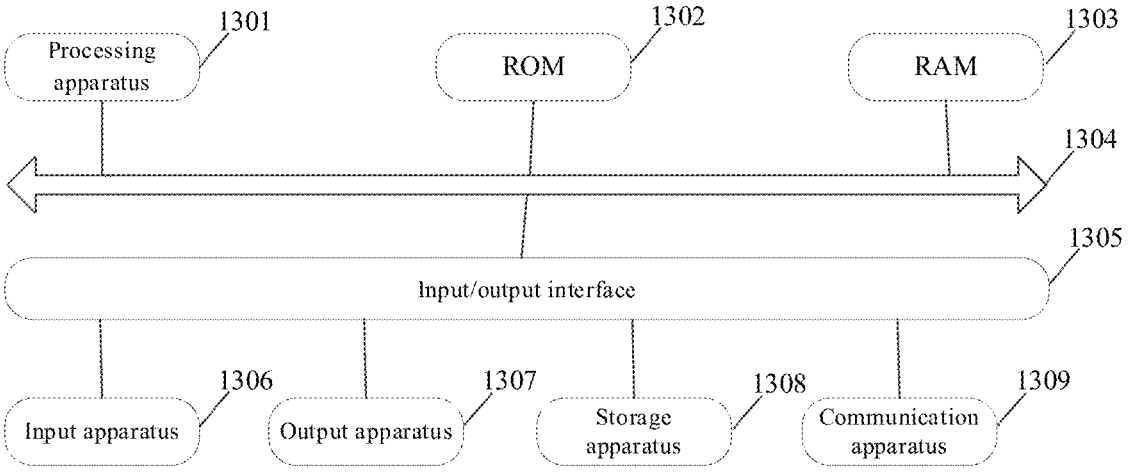
FIG. 13 is a structural schematic diagram of an electronic device provided by an embodiment of the present disclosure.

FIG. 13 is a structural schematic diagram of an electronic device provided by an embodiment of the present disclosure.

Hereinafter, specifically referring to FIG. 13, it shows a structural schematic diagram of an electronic device 1300 suitable for implementing the embodiment of the present disclosure. The electronic device 1300 according to the embodiment of the present disclosure may include but not limited to a mobile terminal such as a mobile phone, a laptop, a digital broadcast receiver, a Personal Digital Assistant (PDA), a Portable Android Device (PAD), a Portable Multimedia Player (PMP), a vehicle-mounted terminal (e.g., a vehicle-mounted navigation terminal), etc., and a stationary terminal such as a digital TV, a desktop computer, etc. The electronic device shown in FIG. 13 is only an example and should not impose any limitation on functionality and scope of use of the embodiment of the present disclosure.

As shown in FIG. 13, the electronic device 1300 may include a processing apparatus (e.g., a central processing unit, a graphics processing unit, etc.) 1301, which may execute various appropriate actions and processing according to a program stored in a Read-Only Memory (ROM) 1302 or a program loaded from a storage apparatus 1308 into a Random Access Memory (RAM) 1303. The RAM 1303 further stores various programs and data required for operation of the electronic device 1300. The processing apparatus 1301, the ROM 1302, and the RAM 1303 are connected with each other through a bus 1304. An input/output (I/O) interface 1305 is also coupled to the bus 1304.

Usually, apparatuses below may be coupled to the I/O interface 1305: input apparatuses 1306 including, for example, a touch screen, a touch pad, a keyboard, a mouse, a camera, a microphone, an accelerometer, a gyroscope, etc.; output apparatuses 1307 including, for example, a Liquid Crystal Display (LCD), a speaker, a vibrator, etc.; storage apparatuses 1308 including, for example, a magnetic tape, a hard disk, etc.; and a communication apparatus 1309. The communication apparatus 1309 may allow the electronic device 1300 to perform wireless or wired communication with other devices so as to exchange data. Although FIG. 13 shows the electronic device 1300 including various apparatuses, it should be understood that, it is not required to implement or have all the apparatuses shown, and the electronic device 1300 may alternatively implement or have more or fewer apparatuses.

Specifically, according to the embodiments of the present disclosure, the process described above with reference to a flow chart may be implemented as computer software programs. For example, the embodiments of the present disclosure include a computer program product, including a computer program carried on a non-temporary computer readable medium, the computer program including program codes for executing the method shown in the flow chart. In such embodiments, the computer program may be downloaded and installed from the network via the communication apparatus 1309, or installed from the storage apparatus 1308, or installed from the ROM 1302. When executed by the processing apparatus 1301, the computer program may execute the above-described functions defined in the multimedia data processing according to the embodiment of the present disclosure.

It should be noted that, the above-described computer readable medium according to the present disclosure may be a computer readable signal medium or a computer readable storage medium or any combination of the above two. The computer readable storage medium may be, for example, but not limited to, an electronic, magnetic, optical, electromagnetic, infrared, or semiconductor system, apparatus, or device, or any suitable combination of the above. More specific examples of the computer readable storage medium may include, but not limited to: an electrical connection having one or more conductors, a portable computer diskette, a hard disk, a Random Access Memory (RAM), a Read-Only Memory (ROM); an Erasable Programmable Read-Only Memory (EPROM or flash memory); an optical fiber, a portable Compact Disc Read-Only Memory (CD-ROM); an optical storage device; a magnetic storage device; or any suitable combination of the above. In the present disclosure, a computer readable storage medium may be any tangible medium that includes or stores a program that may be used by or in conjunction with an instruction executing system, an apparatus, or a device. Rather, in the present disclosure, the computer readable signal medium may include a data signal propagated in baseband or as a portion of a carrier wave, which carries a computer readable program code therein. Such propagated data signals may take a variety of forms, including but not limited to, electromagnetic signals, optical signals, or any suitable combination of the above. The computer readable signal medium may also be any computer readable medium other than a computer readable storage medium; and the computer readable signal medium may transmit, propagate, or transport programs for use by or in combination with the instruction executing system, the apparatus, or the device. The program code embodied on the computer readable medium may be transmitted by using any suitable medium, including, but not limited to, an electrical wire, an optical cable, a Radio Frequency (RF), etc., or any suitable combination of the above.

In some implementations, the client and the server may communicate with any network protocol currently known or to be researched and developed in the future such as Hyper-Text Transfer Protocol (HTTP), and may communicate (e.g., via a communication network) and interconnect with digital data in any form or medium. Examples of communication networks include a Local Area Network ("LAN"), a Wide Area Network ("WAN"), the Internet, and an end-to-end network (e.g., an ad hoc end-to-end network), as well as any network currently known or to be researched and developed in the future.

The above-described computer readable medium may be included in the above-described electronic device; or may also exist alone without being assembled into the electronic device.

The above-described computer readable medium carries one or more programs; and when executed by the electronic device, the above-described one or more programs cause the electronic device to execute steps of:

Receiving text information input by a user; generating multimedia data based on the text information, in response to a processing instruction for the text information, and exhibiting a multimedia edit interface for performing an edition operation on the multimedia data, wherein, the multimedia data includes a plurality of multimedia clips; the plurality of multimedia clips respectively correspond to a plurality of text clips split from the text information; the plurality of multimedia clips include a plurality of voice clips generated through speeches respectively corresponding to the plurality of text clips, and a plurality of video image clips respectively matched with the plurality of text clips; the multimedia edit interface includes: a first edit track, a second edit track and a third edit track; wherein, a first track clip corresponding to the first edit track, a second track clip corresponding to the second edit track, and a third track clip corresponding to the third edit track whose timelines are aligned on the edit tracks respectively identify a text clip, a video image clip and a voice clip corresponding thereto; in the embodiment of the present disclosure, the edit tracks corresponding to the multimedia data are enriched, which may meet diverse edition needs of the multimedia data and improve quality of the multimedia data.

The electronic device may write the computer program codes for executing the operations according to the present disclosure in one or more programming languages or a combination thereof; the above-described programming languages include, but not limited to, object-oriented programming languages such as Java, Smalltalk, C++, and also include conventional procedural programming languages such as "C" language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a Local Area Network (LAN) or a Wide Area Network (WAN), or the connection may be made to an external computer (e.g., through the Internet using an Internet Service Provider).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which comprises one or more executable instructions for implementing specified logical function(s). It should also be noted that, in some alternative implementations, the functions noted in the block may occur out of the order noted in the accompanying drawings. For example, two blocks shown in succession may, in fact, be executed substantially concurrently, or the blocks may sometimes be executed in a reverse order, depending upon the functionality involved. It should also be noted that, each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The units involved in the embodiments of the present disclosure may be implemented by software or hardware. Wherein, a name of the unit does not constitute limitation of the unit per se in some cases.

The functions described herein above may be executed, at least partially, by one or more hardware logic components. For example, without limitation, available exemplary types of hardware logic components include: a Field Programmable Gate Array (FPGA), an Application Specific Integrated Circuit (ASIC), an Application Specific Standard Product (ASSP), a System on Chip (SOC), a Complex Programmable Logical Device (CPLD), etc.

In the context of the present disclosure, a machine-readable medium may be a tangible medium, which may include or store programs for use by or in combination with an instruction executing system, an apparatus or a device. The machine-readable medium may be a machine-readable signal medium or a machine-readable storage medium. Machine-readable media may include, but are not limited to, electronic, magnetic, optical, electromagnetic, infrared, or semiconductor systems, apparatuses, or devices, or any suitable combination of the above contents. A more specific example of the machine-readable storage medium would include an electrical connection based on one or more lines, a portable computer disk, a hard disk, a Random Access Memory (RAM), a Read-Only Memory (ROM), an Erasable Programmable Read-Only Memory (EPROM or a flash memory), an optical fiber, a portable Compact Disk Read-Only Memory (CD-ROM), an optical storage device, a magnetic storage device, or any suitable combination of the above contents.

The above description is only preferred embodiments of the present disclosure and explanation of the applied technical principles. Those skilled in the art should understand that the scope of disclosure involved in the present disclosure is not only limited to the technical solutions formed by the specific combination of the above-described technical features, but also covers other technical solutions formed by an arbitrary combination of the above-described technical features or equivalent features thereof without departing from the above-described disclosure concept. For example, the above-described features and the technical features disclosed in the present disclosure (but not limited thereto) and having similar functions are replaced with each other to form a technical solution.

Furthermore, although the respective operations are described in a particular order, this should not be understood as requiring the operations to be executed in the particular order shown or in a sequential order. Under certain circumstances, multitasking and parallel processing may be favorable. Similarly, although the above discussion includes a number of specific implementation details, these should not be interpreted as limiting the scope of the present disclosure. Certain features as described in the context of separate embodiments may also be implemented in a single embodiment in combination. Conversely, various features as described in the context of a single embodiment may also be implemented in a plurality of embodiments individually or in any suitable sub-combination.

Although the subject matter has been described in terms specific to the structural features and/or method logic actions, it should be understood that the subject matter defined in the appended claims is not necessarily limited to the specific features or actions as described above. On the contrary, the specific features and actions as described above are only examples of implementing the claims.

The invention claimed is:

1. A multimedia data processing method, comprising:
receiving text information input by a user via a first interface, wherein the first interface comprises a control for generating a video;
splitting the text information into a plurality of text clips;
in response to receiving a selection of the control, generating a plurality of multimedia clips of the video based on the text information, wherein each of the plurality of multimedia clips corresponds to a different one of the plurality of text clips, and wherein each of the plurality of multimedia clips comprises a voice clip and a video image clip associated with the corresponding text clip;

displaying a second interface configured to perform editing operations on at least a portion of the generated plurality of multimedia clips, wherein the second interface comprises a first region and a second region;

displaying a first edit track, a second edit track, and a third edit track in the first region of the second interface, and simultaneously displaying a plurality of first track clips in the first edit track, a plurality of second track clips in the second edit track, and a plurality of third track clips in the third edit track, wherein the plurality of first track clips are configured to display the plurality of text clips, wherein the plurality of second track clips are configured to display video image clips corresponding to the plurality of text clips, wherein the plurality of third track clips are configured to display voice clips corresponding to the plurality of text clips, and wherein a timeline of the plurality of first track clips in the first edit track is aligned with a timeline of the plurality of second track clips in the second edit track and a timeline of the plurality of third track clips in the third edit track to respectively identify a text clip, a video image clip corresponding to the text clip, and a voice clip corresponding to the text clip;

determining a type of a clip selected from the plurality of text clips, the video image clips, and the voice clips displayed in the first region of the second interface; and displaying a set of editing controls corresponding to the type of the selected clip in the second region of the second interface, wherein the second region of the second interface is configured to display one of a plurality sets of editing controls, and the plurality of sets of editing controls correspond to a plurality of clip types.

2. The method according to claim 1, wherein, the receiving text information input by a user, comprises:

receiving text information input by the user in a text region; and/or, receiving link information input by the user in a link region, identifying the link information to acquire text information on a corresponding page, and displaying the same in the text region for edition by the user.

3. The method according to claim 1, further comprising:

displaying a timbre selection entry control;

display a candidate timbre menu, in response to a trigger operation of the user for the timbre selection entry control, wherein, the candidate timbre menu comprises candidate timbres, as well as an audition control corresponding to the candidate timbre;

determining a first target timbre according to a selection operation of the user for the candidate timbre menu; and acquiring a plurality of voice clips generated through speeches of the plurality of text clips split from the text information based on the first target timbre.

4. The method according to claim 1, further comprising:

displaying a currently identified text clip on a first target track clip in a text edit region, in response to the first target track clip selected by the user on the first edit track;

updating to identify a target text clip on the first target track clip, based on the target text clip generated through modification performed by the user on the currently displayed text clip in the text edit region.

5. The method according to claim 4, further comprising:

determining a third target track clip corresponding to the first target track clip on the third edit track clip, in response to a text update operation performed on the target text clip on the first target track clip; and acquiring a target voice clip corresponding to the target text clip, and updating to identify the target voice clip on the third target track clip.

6. The method according to claim 5, further comprising:

keeping the second edit track unchanged, in a case where it is detected that a first update time length corresponding to the target text clip on the first edit track is inconsistent with a time length corresponding to the text clip before modification, and displaying a first update track clip corresponding to the first update time length in a preset first candidate region, wherein, the target text clip is identified on the first update track clip;

keeping the second edit track unchanged, in a case where it is detected that a third update time length corresponding to the target voice clip on the third edit track is inconsistent with a time length corresponding to the voice clip before modification, and displaying a third update track clip corresponding to the third update time length in a preset second candidate region, wherein, the target voice clip is identified on the third update track clip.

7. The method according to claim 5, further comprising:

adjusting a length of the first target track clip according to a first update time, in a case where it is detected that a first update time length corresponding to the target text clip on the first edit track is inconsistent with a time length corresponding to the text clip before modification;

adjusting a length of the third target track clip according to a third update time, in a case where it is detected that a third update time length corresponding to the target voice clip on the third edit track is inconsistent with a time length corresponding to the voice clip before modification;

correspondingly adjusting a length of a second target track clip corresponding to the first target track clip and the third target track clip on the second edit track, so that timelines of the adjusted first target track clip, the adjusted second target track clip, and the adjusted third target track clip are aligned.

8. The method according to claim 4, further comprising:

determining a second target track clip corresponding to the first target track clip is on the second edit track, in response to a text update operation performed on the target text clip on the first target track clip;

acquiring a target video image clip matched with the target text clip, and updating to identify the target video image clip on the second target track clip.

9. The method according to claim 1, further comprising:

responding to a third target track clip selected by the user on the third edit track, wherein, the third target track clip correspondingly identifies the voice clip corresponding to the text clip displayed by the first target track clip;

displaying a current timbre used by the voice clip on the third target track clip in a preset audio edit region, and displaying an alternative candidate timbre;

updating to identify a target voice clip on the third target track clip, based on the second target timbre generated through modification performed by the user on the current timbre according to the candidate timbre in the audio edit region, wherein, the target voice clip is a voice clip generated by reading the text clip identified by the first target track clip by using the second target timbre.

10. The method according to claim 1, wherein, the second interface further comprises:
a fourth edit track, configured to identify background audio data;
displaying a current background sound used by the fourth edit track in a preset background sound edit region, in response to a trigger operation for the fourth edit track, and displaying an alternative candidate background sound; and
updating to identify a target background sound on the fourth edit track, based on the target background sound generated through modification by the user on the current background sound according to the candidate background sound in the background sound edit region.

11. An electronic device, comprising:
a processor; and a memory, configured to store executable instructions, wherein the processor is configured to read the executable instructions from the memory, and execute the executable instructions to implement operations comprising:
receiving text information input by a user via a first interface, wherein the first interface comprises a control for generating a video;
splitting the text information into a plurality of text clips;
in response to receiving a selection of the control, generating a plurality of multimedia clips of the video based on the text information, wherein each of the plurality of multimedia clips corresponds to a different one of the plurality of text clips, and wherein each of the plurality of multimedia clips comprises a voice clip and a video image clip associated with the corresponding text clip;
displaying a second interface configured to perform editing operations on at least a portion of the generated plurality of multimedia clips, wherein the second interface comprises a first region and a second region;
displaying a first edit track, a second edit track, and a third edit track in the first region of the second interface, and simultaneously displaying a plurality of first track clips in the first edit track, a plurality of second track clips in the second edit track, and a plurality of third track clips in the third edit track, wherein the plurality of first track clips are configured to display the plurality of text clips, wherein the plurality of second track clips are configured to display video image clips corresponding to the plurality of text clips, wherein the plurality of third track clips are configured to display voice clips corresponding to the plurality of text clips, and wherein a timeline of the plurality of first track clips in the first edit track is aligned with a timeline of the plurality of second track clips in the second edit track and a timeline of the plurality of third track clips in the third edit track to respectively identify a text clip, a video image clip corresponding to the text clip, and a voice clip corresponding to the text clip;
determining a type of a clip selected from the plurality of text clips, the video image clips, and the voice clips displayed in the first region of the second interface; and
displaying a set of editing controls corresponding to the type of the selected clip in the second region of the second interface, wherein the second region of the second interface is configured to display one of a plurality sets of editing controls, and the plurality of sets of editing controls correspond to a plurality of clip types.

12. The electronic device according to claim 11, wherein, the receiving text information input by a user, comprises:
receiving text information input by the user in a text region; and/or,
receiving link information input by the user in a link region, identifying the link information to acquire text information on a corresponding page, and displaying the same in the text region for edition by the user.

13. The electronic device to claim 11, the operations further comprising:
displaying a timbre selection entry control;
displaying a candidate timbre menu, in response to a trigger operation of the user for the timbre selection entry control, wherein, the candidate timbre menu comprises candidate timbres, as well as an audition control corresponding to the candidate timbre;
determining a first target timbre according to a selection operation of the user for the candidate timbre menu; and
acquiring a plurality of voice clips generated through speeches of the plurality of text clips split from the text information based on the first target timbre.

14. The electronic device according to claim 11, the operations further comprising:
displaying a currently identified text clip on a first target track clip in a text edit region, in response to the first target track clip selected by the user on the first edit track;
updating to identify a target text clip on the first target track clip, based on the target text clip generated through modification performed by the user on the currently displayed text clip in the text edit region.

15. The electronic device according to claim 14, the operations further comprising:
determining a third target track clip corresponding to the first target track clip on the third edit track clip, in response to a text update operation performed on the target text clip on the first target track clip; and
acquiring a target voice clip corresponding to the target text clip, and updating to identify the target voice clip on the third target track clip.

16. The electronic device according to claim 15, the operations further comprising:
keeping the second edit track unchanged, in a case where it is detected that a first update time length corresponding to the target text clip on the first edit track is inconsistent with a time length corresponding to the text clip before modification, and displaying a first update track clip corresponding to the first update time length in a preset first candidate region, wherein, the target text clip is identified on the first update track clip;
keeping the second edit track unchanged, in a case where it is detected that a third update time length corresponding to the target voice clip on the third edit track is inconsistent with a time length corresponding to the voice clip before modification, and displaying a third update track clip corresponding to the third update time length in a preset second candidate region, wherein, the target voice clip is identified on the third update track clip.

17. The electronic device according to claim 15, the operations further comprising:
adjusting a length of the first target track clip according to a first update time, in a case where it is detected that a first update time length corresponding to the target text clip on the first edit track is inconsistent with a time length corresponding to the text clip before modification;

adjusting a length of the third target track clip according to a third update time, in a case where it is detected that a third update time length corresponding to the target voice clip on the third edit track is inconsistent with a time length corresponding to the voice clip before modification;

correspondingly adjusting a length of a second target track clip corresponding to the first target track clip and the third target track clip on the second edit track, so that timelines of the adjusted first target track clip, the adjusted second target track clip, and the adjusted third target track clip are aligned.

18. The electronic device according to claim 14, the operations further comprising:

determining a second target track clip corresponding to the first target track clip is on the second edit track, in response to a text update operation performed on the target text clip on the first target track clip;

acquiring a target video image clip matched with the target text clip, and updating to identify the target video image clip on the second target track clip.

19. A non-transitory computer readable storage medium, having a computer program stored therein, wherein the computer program, when executed by a processor, causes the processor to implement operations comprising:

receiving text information input by a user via a first interface, wherein the first interface comprises a control for generating a video;

splitting the text information into a plurality of text clips;

in response to receiving a selection of the control, generating a plurality of multimedia clips of the video based on the text information, wherein each of the plurality of multimedia clips corresponds to a different one of the plurality of text clips, and wherein each of the plurality of multimedia clips comprises a voice clip and a video image clip associated with the corresponding text clip;

displaying a second interface configured to perform editing operations on at least a portion of the generated plurality of multimedia clips, wherein the second interface comprises a first region and a second region;

displaying a first edit track, a second edit track, and a third edit track in the first region of the second interface, and simultaneously displaying a plurality of first track clips in the first edit track, a plurality of second track clips in the second edit track, and a plurality of third track clips in the third edit track, wherein the plurality of first track clips are configured to display the plurality of text clips, wherein the plurality of second track clips are configured to display video image clips corresponding to the plurality of text clips, wherein the plurality of third track clips are configured to display voice clips corresponding to the plurality of text clips, and wherein a timeline of the plurality of first track clips in the first edit track is aligned with a timeline of the plurality of second track clips in the second edit track and a timeline of the plurality of third track clips in the third edit track to respectively identify a text clip, a video image clip corresponding to the text clip, and a voice clip corresponding to the text clip;

determining a type of a clip selected from the plurality of text clips, the video image clips, and the voice clips displayed in the first region of the second interface; and displaying a set of editing controls corresponding to the type of the selected clip in the second region of the second interface, wherein the second region of the second interface is configured to display one of a plurality sets of editing controls, and the plurality of sets of editing controls correspond to a plurality of clip types.

\*   \*   \*   \*   \*